(12) United States Patent
Zheng

(10) Patent No.: US 10,145,750 B2
(45) Date of Patent: Dec. 4, 2018

(54) MEMS PRESSURE SENSING ELEMENT

(71) Applicant: GOERTEK.INC, Weifang, Shandong (CN)

(72) Inventor: Guoguang Zheng, Weifang (CN)

(73) Assignee: GOERTEK. INC., Weifang, Shandong (CN)

( * ) Notice: Subject to any disclaimer, the term of this patent is extended or adjusted under 35 U.S.C. 154(b) by 0 days.

(21) Appl. No.: 15/572,072

(22) PCT Filed: Dec. 10, 2015

(86) PCT No.: PCT/CN2015/096918
§ 371 (c)(1),
(2) Date: Nov. 6, 2017

(87) PCT Pub. No.: WO2017/000500
PCT Pub. Date: Jan. 5, 2017

(65) Prior Publication Data
US 2018/0136062 A1   May 17, 2018

(30) Foreign Application Priority Data

Jun. 29, 2015  (CN) .......................... 2015 1 0367571

(51) Int. Cl.
*G01L 9/00* (2006.01)
*G01L 9/02* (2006.01)
(Continued)

(52) U.S. Cl.
CPC .............. *G01L 9/0051* (2013.01); *G01L 9/02* (2013.01); *G01L 2009/0066* (2013.01)

(58) Field of Classification Search
CPC . G01L 7/02; G01L 9/0051; G01L 2009/0066; G01L 1/18; G01L 7/08;
(Continued)

(56) References Cited

U.S. PATENT DOCUMENTS 7,290,453 B2    11/2007  Brosh
9,790,086 B2 *  10/2017  Kalz ........................ B81B 7/02
(Continued)

FOREIGN PATENT DOCUMENTS

CN         1796954 A      7/2006
CN       103335753 A     10/2013
(Continued)

OTHER PUBLICATIONS

The First Chinese Office Action dated Aug. 31, 2016; Appln. 201510367571.3.
(Continued)

*Primary Examiner* — Manish S Shah
*Assistant Examiner* — Suman K Nath
(74) *Attorney, Agent, or Firm* — Ladas & Parry LLP

(57) ABSTRACT

An MEMS pressure sensing element is disclosed, comprising a substrate with a groove; a pressure-sensitive film on the substrate for sealing an opening of the groove to form a sealed cavity body; and a pressure-sensitive beam suspended in the sealed cavity body and parallel with the pressure-sensitive film provided with varistors, wherein a center of the pressure-sensitive beam is fixedly connected to that of the pressure-sensitive film, and a periphery is fixedly connected to a bottom wall of the groove of the substrate, such that the pressure-sensitive film drives the pressure-sensitive beam to bending deformation under an external pressure.

4 Claims, 5 Drawing Sheets

(51) Int. Cl.
*G01L 1/18* (2006.01)
*G01L 7/08* (2006.01)
*G01L 23/18* (2006.01)
*G01L 7/02* (2006.01)

(58) Field of Classification Search
CPC ..... G01L 7/082; G01L 9/0045; G01L 9/0002; G01L 23/18; G01P 15/122; G01P 15/123
USPC ........... 73/861.47, 861.42, 715, 726, 514.34, 73/514.11, 514.23
See application file for complete search history.

(56) References Cited

U.S. PATENT DOCUMENTS

| | | |
|---|---|---|
| 2006/0144153 A1 | 7/2006 | Brosh |
| 2007/0277616 A1* | 12/2007 | Nikkel .................. G01L 9/0052 73/715 |
| 2010/0050771 A1* | 3/2010 | Je ........................ G01P 15/0802 73/514.32 |
| 2010/0251826 A1 | 10/2010 | Choi et al. |
| 2013/0091949 A1* | 4/2013 | Huang ................. G01P 15/0802 73/514.34 |
| 2015/0300895 A1* | 10/2015 | Matsudate ......... A61B 18/1492 73/777 |

FOREIGN PATENT DOCUMENTS

| | | |
|---|---|---|
| CN | 103344374 A | 10/2013 |
| CN | 104897333 A | 9/2015 |
| CN | 204758194 U | 11/2015 |

OTHER PUBLICATIONS

Notification of Patent Grant dated Apr. 1, 2017; Appln, 201510367571.3.

International Search Report dated Apr. 5, 2016; PCT/CN2015/096918.

* cited by examiner

MEMS PRESSURE SENSING ELEMENT

CROSS REFERENCE TO RELATED APPLICATION

This application is a national state application, filed under 35 U.S.C. 371, of International Application No. PCT/CN2015/096918, filed on Dec. 10, 2015, which claims priorities to Chinese Application No. 201510367571.3 filed on Jun. 29, 2015, the content of which is hereby incorporated by reference in its entirety.

FIELD OF THE INVENTION

The present invention relates to the field of sensors, in particular to a micro electro-mechanical system (MEMS) pressure sensing element.

BACKGROUND OF THE INVENTION

For present MEMS pressure sensors, regardless of a piezoresistive or capacitive type, a pressure-sensitive film needs to be exposed in air; otherwise, the pressure-sensitive film cannot make a sensitive reaction to external air pressure. Such a pressure-sensitive film is applied generally as an electrical capacitance polar plate or resistor, and because it must be exposed in air and cannot be disposed in a closed electrical cavity body, external electromagnetic interference will cause an influence on the output of the MEMS pressure sensor.

SUMMARY OF THE INVENTION

One object of this invention is to provide an MEMS pressure sensing element that can shield electromagnetic interference on an electrical part of a pressure sensing element from the external.

According to a first aspect of the present invention, there is provided an MEMS pressure sensing element, comprising a substrate provided with a groove; a pressure-sensitive film disposed on the substrate, the pressure-sensitive film sealing an opening of the groove to form a sealed cavity body; and a pressure-sensitive beam suspended in the sealed cavity body and parallel to the pressure-sensitive film, the pressure-sensitive beam being provided with a varistor; and wherein a center of the pressure-sensitive beam is fixedly connected to that of the pressure-sensitive film by a first anchor, and a periphery of the pressure-sensitive beam is fixedly connected to a bottom wall of the groove of the substrate, such that the pressure-sensitive film drives the pressure-sensitive beam to bending deformation under an external pressure.

Alternatively or optionally, the periphery of the pressure-sensitive beam is fixedly connected to the bottom wall of the groove of the substrate by an anchor ring.

Alternatively or optionally, the pressure-sensitive beam is cross-shaped, and an end of four sides of the pressure-sensitive beam away from the center of the pressure-sensitive beam is fixedly connected to the bottom wall of the groove of the substrate by the anchor ring respectively.

Alternatively or optionally, the pressure-sensitive beam is cross-shaped, and an end of four sides of the pressure-sensitive beam away from the center of the pressure-sensitive beam is fixedly connected to the bottom wall of the groove of the substrate by anchor respectively.

Alternatively or optionally, the element comprises 4 varistors, which are disposed on four sides of the pressure-sensitive beam correspondingly and form a Wheatstone bridge.

Alternatively or optionally, a limiting protrusion part is further disposed in the sealed cavity body, and the limiting protrusion is disposed on the bottom wall of the groove of the substrate and located below the center of the pressure-sensitive beam.

Alternatively or optionally, the pressure-sensitive film is made of monocrystalline silicon material.

Alternatively or optionally, a thickness of the pressure-sensitive film is 10 μm-30 μm.

According to the MEMS pressure sensing element of the disclosure, when pressure acts on the pressure-sensitive film, the pressure-sensitive film will deform and drive the pressure-sensitive beam to move to cause the pressure-sensitive beam to bend, then a change of resistance values of the varistors on the pressure-sensitive beam is caused, in this way, not only is a pressure-sensitive function finished, but also the external electromagnetic interference on an electrical part of the pressure sensing element is also shielded.

The inventor of the present disclosure has found that in prior art, there is still no MEMS pressure sensing elements that can shield the external electromagnetic interference outside the electrical part. Therefore, those skilled in the art have never thought of or expected a technical task to be implemented or a technical problem to be solved by the present disclosure, and thus the present disclosure is a new technical solution.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
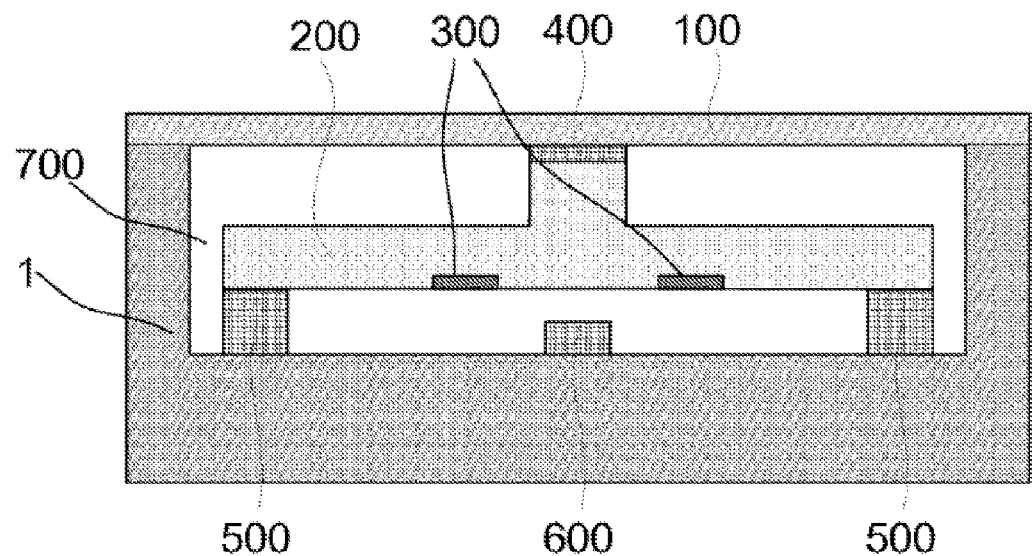
FIG. 1 is a schematic diagram of embodiments of an MEMS pressure sensing element of the present disclosure.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 2:
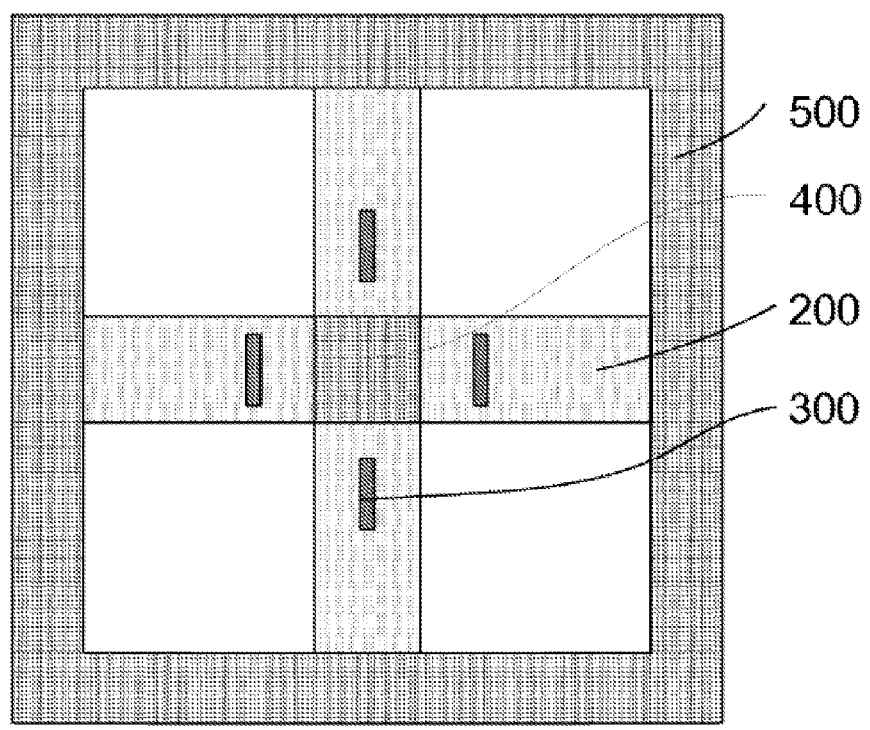
FIG. 2 is a schematic plan view of a pressure-sensitive beam in FIG. 1.

An embodiment of the MEMS pressure sensing element of the present disclosure is introduced referring to FIGS. 1-2. The element comprises:

A substrate 1 provided with a groove, a pressure-sensitive film 100 disposed on the substrate 1, the pressure-sensitive film 100 sealing an opening of the groove to form a sealed cavity body 700; and A pressure-sensitive beam 200 suspended in the sealed cavity body 700 and parallel to the pressure-sensitive film 100, the pressure-sensitive beam 200 being provided with a varistor 300.

The pressure-sensitive beam 200 is cross-shaped, a center of the pressure-sensitive beam 200 is fixedly connected to that of the pressure-sensitive film 100 by a first anchor 400, and an end of four sides of the pressure-sensitive beam 200 away from the center of the pressure-sensitive beam 200 is fixedly connected to the bottom wall of the groove of the substrate 1 by an anchor ring 500, respectively.

In another embodiment, an end of four sides of the pressure-sensitive beam 200 away from the center of the pressure-sensitive beam 200 is fixedly connected to the bottom wall of the groove 1 of the substrate by anchor point respectively. In other embodiments, the pressure-sensitive beam 20 can be in other shapes, and a periphery of the pressure-sensitive beam 200 is fixedly connected to a bottom wall of the groove of the substrate 1.

In the present embodiment, the element comprising 4 varistors, which are disposed on four sides of the pressure-sensitive beam 200 correspondingly and form a Wheatstone bridge.

A limiting protrusion part 600 is further disposed in the sealed cavity body 700, and the limiting protrusion part 600 is disposed on the bottom wall of the groove of the substrate 1 and located below the center of the pressure-sensitive beam 200. The limiting protrusion part 600 is used for limiting displacement of the pressure-sensitive beam 200, in order to avoid damage and function failure of the pressure-sensitive beam 200 caused by overlarge displacement.

The first anchor 400 and the anchor ring 500 are made of oxide preferably. The pressure-sensitive film 100 is made of monocrystalline silicon material preferably, and a thickness of it is 10 μm-30 μm preferably.

When a pressure acts on the pressure-sensitive film 100, the pressure-sensitive film 100 will deform and drive the pressure-sensitive beam 200 to move to cause the pressure-sensitive beam 200 to bend; then causing a change of resistance values of the varistors 300 on the pressure-sensitive beam 200. Therefore, the change of an external pressure can be read within the pressure sensing element. The pressure-sensitive film is connected to a ground potential, so that not only is the detection on the external pressure realized, but also the external electromagnetic interference is shielded outside the electrical part, improving the precision of the MEMS pressure sensor.

A manufacturing process for the MEMS pressure sensing element of the embodiments above is introduced referring to FIGS. 3-13.

Figure 3:
FIGS. 3-13 are schematic diagrams of a manufacturing process for the MEMS pressure sensing element of embodiments of the present disclosure.
Figure 4:
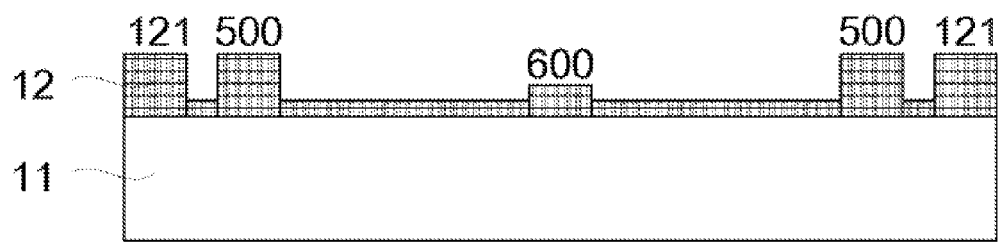

S101: referring to FIG. 3, a first wafer 11 is provided; referring to FIG. 4, a first oxide layer 12 is deposited on the first wafer 11; the first oxide layer 12 is patterned and etched, a limiting protrusion part 600 located in the center, a first annular connecting part 500 surrounding the limiting protrusion part 600 and a first outer ring supporting part 121 surrounding the first annular connecting part 500 are formed after two steps of etching; wherein the limiting protrusion part 600 is lower, and the first annular connecting part 500 and the first outer ring supporting part 121 are higher; and the first annular connecting part 500 is serves as a anchor point for a periphery of the pressure sensitive beam to fix on the substrate in the subsequent process.

Figure 5:
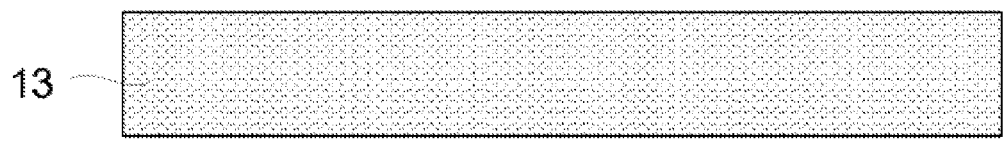
Figure 6:
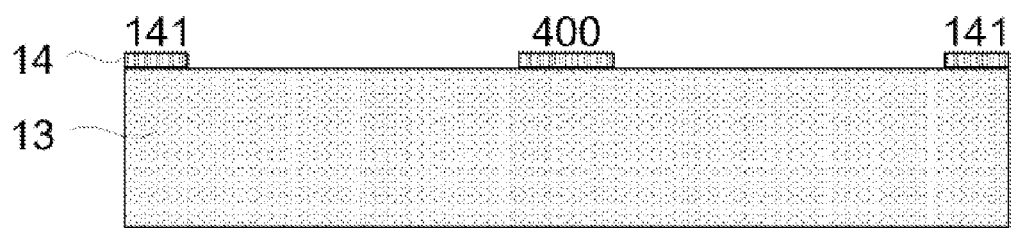

S102: referring to FIG. 5, a second wafer 13 is provided; referring to FIG. 6, a second oxide layer 14 is deposited on a front surface of the second wafer 13; the second oxide layer 14 is patterned and etched to form a second connecting part 400 located in the center and a second outer ring supporting part 141 surrounding the second connecting part 400; and the second connecting part 400 serves as a fixing anchor point between the pressure-sensitive beam and the pressure-sensitive film in the subsequent process.

Figure 7:
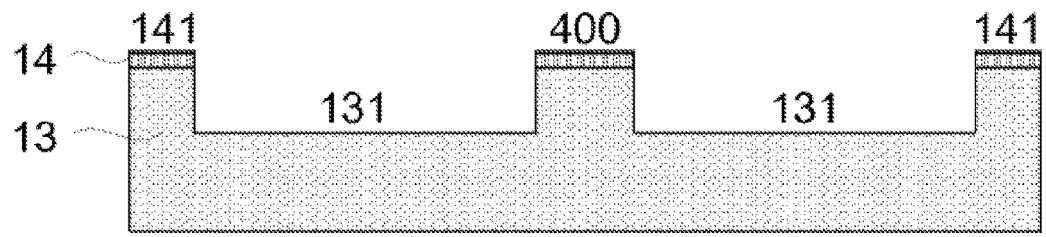

S103: referring to FIG. 7, the second wafer 13 is etched by taking the second connecting part 400 and the second outer ring supporting part 141 as a mask, so that an annular groove 131 is formed in the front surface of the second wafer 13, preventing the pressure-sensitive films from bonding to each other in the subsequent process. The etching here can be deep reactive ion etching (DRIE).

Figure 8:
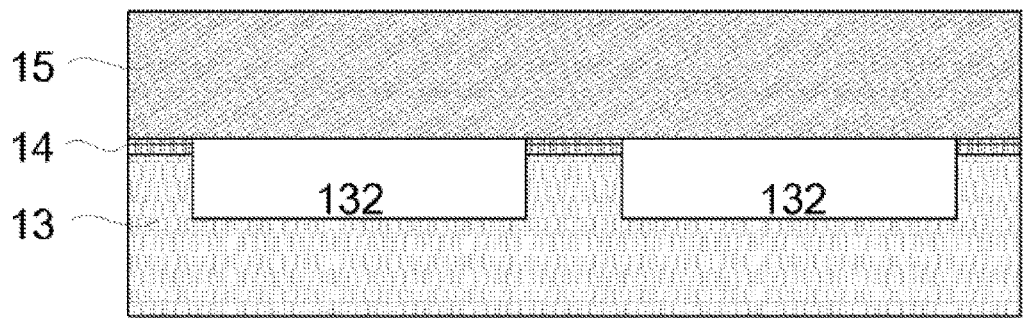

S104: referring to FIG. 8, a third wafer 15 is provided, and the third wafer 15 is connected with the second connecting part 400 and the second outer ring supporting part 141 by bonding.

Figure 9:
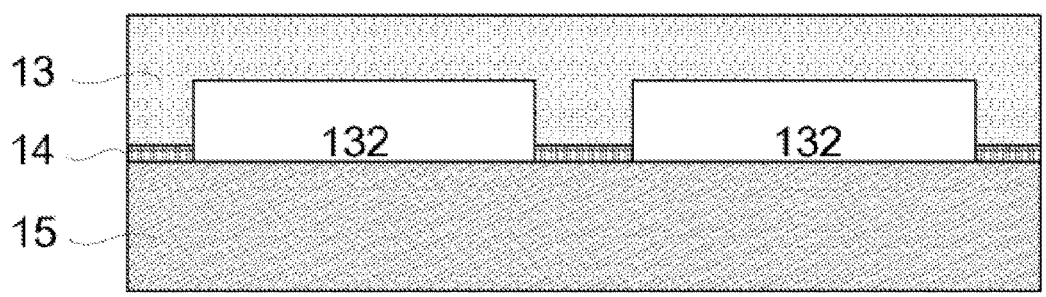

S105: referring to FIG. 9, the structure as shown in FIG. 8 is turned over, and the second wafer 13 is thinned from the back surface of the second wafer 13 to improve sensitivity of the pressure-sensitive beam generated in the subsequent process.

Figure 10:
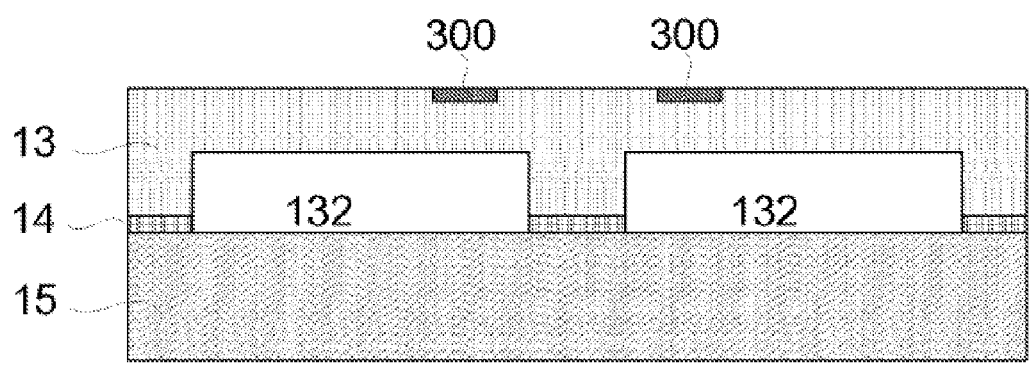

S106: referring to FIG. 10, varistor strips 300 is formed by ion implantation from the back surface of the second wafer 13.

Figure 11:
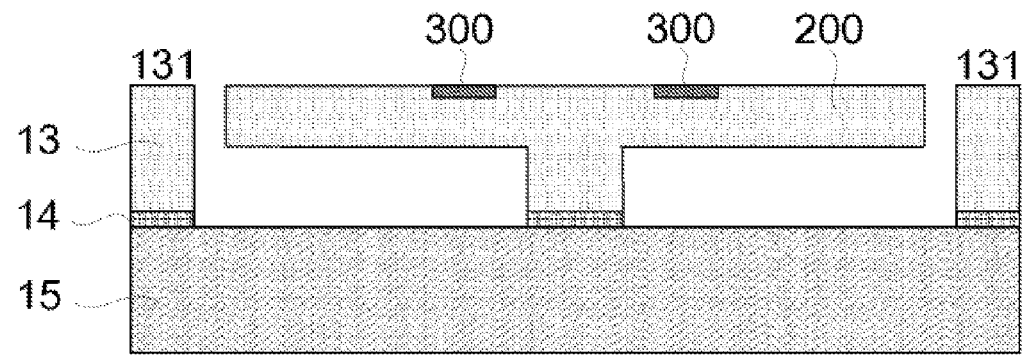

S107: referring to FIG. 11, the second wafer 13 is patterned and etched to form the cross-shaped pressure-sensitive beam 200 and a third outer ring supporting part 131 surrounding the pressure-sensitive beam 200; and the etching here can be deep reactive ion etching (DRIE).

Figure 12:
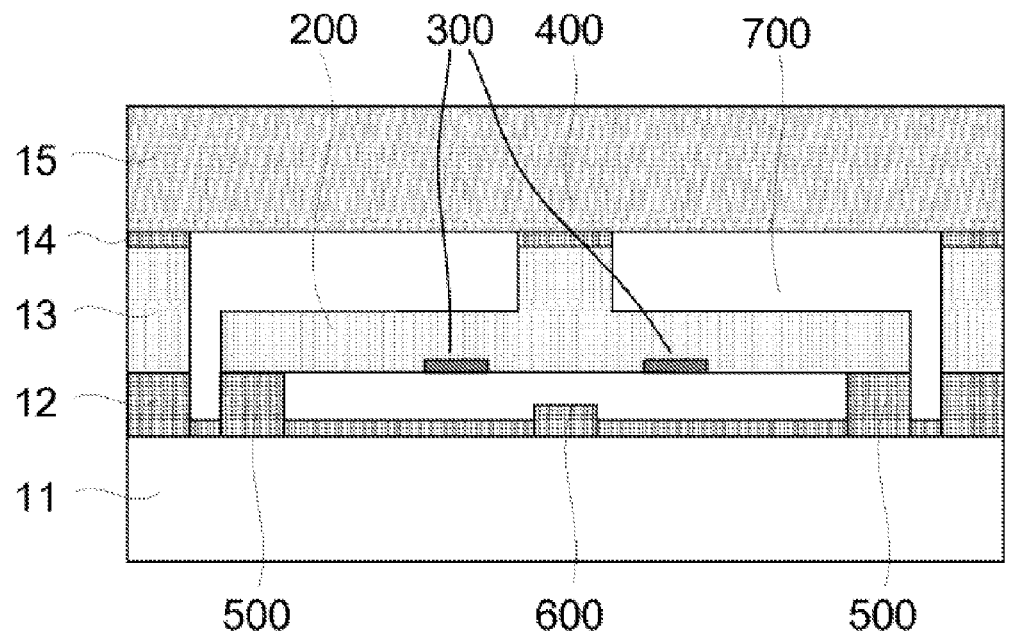

S108: referring to FIG. 12, the pressure-sensitive beam 200 and the first annular connecting part 500 are connected by bonding, and the third outer ring supporting part 131 and the first outer ring supporting part 121 are connected by bonding; after the bonding, the first wafer 11, the third wafer 15, and layers between the first wafer 11 and the third wafer 15 enclose a sealed cavity body 700 together which packages the pressure-sensitive beam 200 therein.

Figure 13:
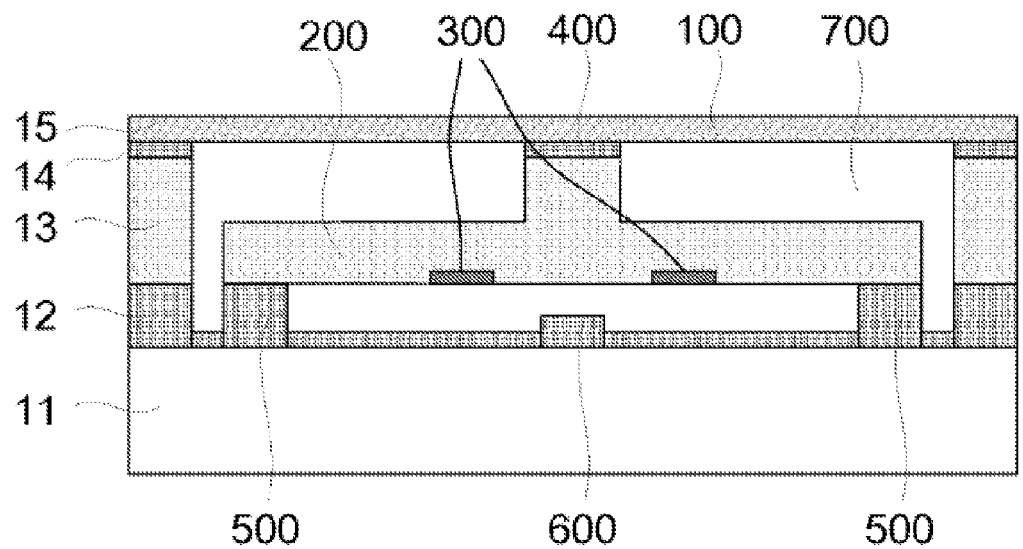

S109: referring to FIG. 13, the third wafer 15 is thinned to form the pressure-sensitive film 100, which is sensitive to pressure.

Although some specific embodiments of the present invention have been demonstrated in detail with examples, it should be understood by a person skilled in the art that the above examples are only intended to be illustrative but not to limit the scope of the present invention.

What is claimed is:
1. A MEMS pressure sensing element comprising:
   a substrate provided with a groove;
   a pressure-sensitive film disposed on the substrate, the pressure-sensitive film sealing an opening of the groove to form a sealed cavity body; and
   a pressure-sensitive beam suspended in the sealed cavity body and parallel to the pressure-sensitive film, the pressure-sensitive beam being provided with a varistor; and wherein the pressure-sensitive beam is cross-shaped, a center of the pressure-sensitive beam is fixedly connected to that of the pressure-sensitive film by a first anchor; and a periphery of the pressure-sensitive beam is fixedly connected to a bottom wall of the groove of the substrate, such that the pressure-sensitive film drives the pressure-sensitive beam to bending deformation under an external pressure;

wherein an end of four sides of the pressure-sensitive beam away from the center of the pressure-sensitive beam is fixedly connected to the bottom wall of the groove of the substrate by an anchor ring respectively; and wherein a limiting protrusion part is further disposed in the sealed cavity body, and the limiting protrusion is disposed on the bottom wall of the groove of the substrate and located below the center of the pressure-sensitive beam.

2. The element according to claim 1, the element comprising four varistors, which are disposed on four sides of the pressure-sensitive beam correspondingly and form a Wheatstone bridge.

3. The element according to claim 1, wherein the pressure-sensitive film is made of monocrystalline silicon material.

4. The element according to claim 1, wherein a thickness of the pressure-sensitive film is 10 μm-30 μm.

* * * * *